US008684534B2

(12) United States Patent
Lin et al.

(10) Patent No.: US 8,684,534 B2
(45) Date of Patent: Apr. 1, 2014

(54) COOLING SYSTEM FOR COOLING A HEAT SOURCE AND PROJECTION APPARATUS HAVING THE SAME

(75) Inventors: Chia-Jui Lin, Taoyuan Hsien (TW); Kuo-Ching Chang, Taoyuan Hsien (TW)

(73) Assignee: Delta Electronics, Inc., Taoyuan Hsien (*) Notice: Subject to any disclaimer, the term of this patent is extended or adjusted under 35 U.S.C. 154(b) by 301 days.

(21) Appl. No.: 13/115,514

(22) Filed: May 25, 2011

(65) Prior Publication Data

US 2012/0133906 A1    May 31, 2012

(30) Foreign Application Priority Data

Nov. 25, 2010    (TW) .............................. 99140743 A (51) Int. Cl.
*G02B 21/16*    (2006.01)
*F25B 21/02*    (2006.01)

(52) U.S. Cl.
USPC .......................... 353/52; 361/679.47; 361/703

(58) Field of Classification Search
USPC .................. 353/52, 54, 56; 362/218, 373; 361/679.46, 679, 688, 696, 697, 701, 361/702, 703; 62/3.7, 3.2
See application file for complete search history.

(56) References Cited

U.S. PATENT DOCUMENTS

| | | | |
|---|---|---|---|
| 6,880,346 B1 * | 4/2005 | Tseng et al. ..................... 62/3.7 | |
| 7,264,359 B2 | 9/2007 | Kawahara et al. | |
| 7,971,440 B2 * | 7/2011 | Chan et al. ....................... 62/3.7 | |
| 2005/0254013 A1 * | 11/2005 | Engle et al. ..................... 353/52 | |
| 2007/0103646 A1 * | 5/2007 | Young .............................. 353/52 | |
| 2009/0122493 A1 | 5/2009 | Hosking et al. | |
| 2010/0050658 A1 * | 3/2010 | Ali .................................. 62/3.2 | |
| 2010/0269517 A1 * | 10/2010 | Ikeda et al. ...................... 62/3.7 | |
| 2011/0072834 A1 * | 3/2011 | Ishikura et al. ................... 62/3.2 | |

FOREIGN PATENT DOCUMENTS

| | | |
|---|---|---|
| CN | 2720631 | 8/2005 |
| CN | 101042520 | 9/2007 |
| CN | 101419386 | 4/2009 |
| CN | 100531534 | 8/2009 |
| CN | 101547587 | 9/2009 |
| CN | 201589926 | 9/2010 |

(Continued)

OTHER PUBLICATIONS

Office Action from corresponding Chinese Appln. No. 201010623145.9 dated May 14, 2013. Partial English translation attached.

(Continued)

*Primary Examiner* — William C Dowling
(74) *Attorney, Agent, or Firm* — Grossman, Tucker, Perreault & Pfleger, PLLC (57) ABSTRACT

A cooling system for cooling a heat source and a projection apparatus having the same are disclosed. The cooling system includes a heat dissipating device and a thermoelectric cooler (TEC). The heat source is disposed on the side of the heat dissipating device. The TEC is disposed on the other side of the heat dissipating device corresponding to the heat source. The TEC is initiated as the temperature of the heat source is greater than the first value, while the TEC is shut off as the temperature of the heat source is lower than the second value. Therefore, the cooling system economizes the energy by controlling the operation of the TEC according to the temperature of the heat source.

13 Claims, 8 Drawing Sheets

(56) References Cited

FOREIGN PATENT DOCUMENTS

| | | |
|---|---|---|
| JP | 2000-338603 | 12/2000 |
| TW | M286410 | 1/2006 |
| TW | M307140 | 3/2007 |
| TW | 200729634 | 8/2007 |
| TW | M387289 | 8/2010 |
| TW | 201037488 | 10/2010 |

OTHER PUBLICATIONS

Office Action from corresponding Taiwanese Appln. No. 099140743 dated Apr. 30, 2013. Partial English translation attached.

* cited by examiner

COOLING SYSTEM FOR COOLING A HEAT SOURCE AND PROJECTION APPARATUS HAVING THE SAME

This application claims priority to Taiwan Patent Application No. 099140743 filed on Nov. 25, 2010, the disclosure of which is incorporated herein by reference in its entirety.

CROSS-REFERENCES TO RELATED APPLICATIONS

Not applicable.

BACKGROUND OF THE INVENTION

1. Field of the Invention

The present invention provides a cooling system, and more particularly, to a cooling system with a power saving function and a projection apparatus having the cooling system.

2. Descriptions of the Related Art

Figure 1:
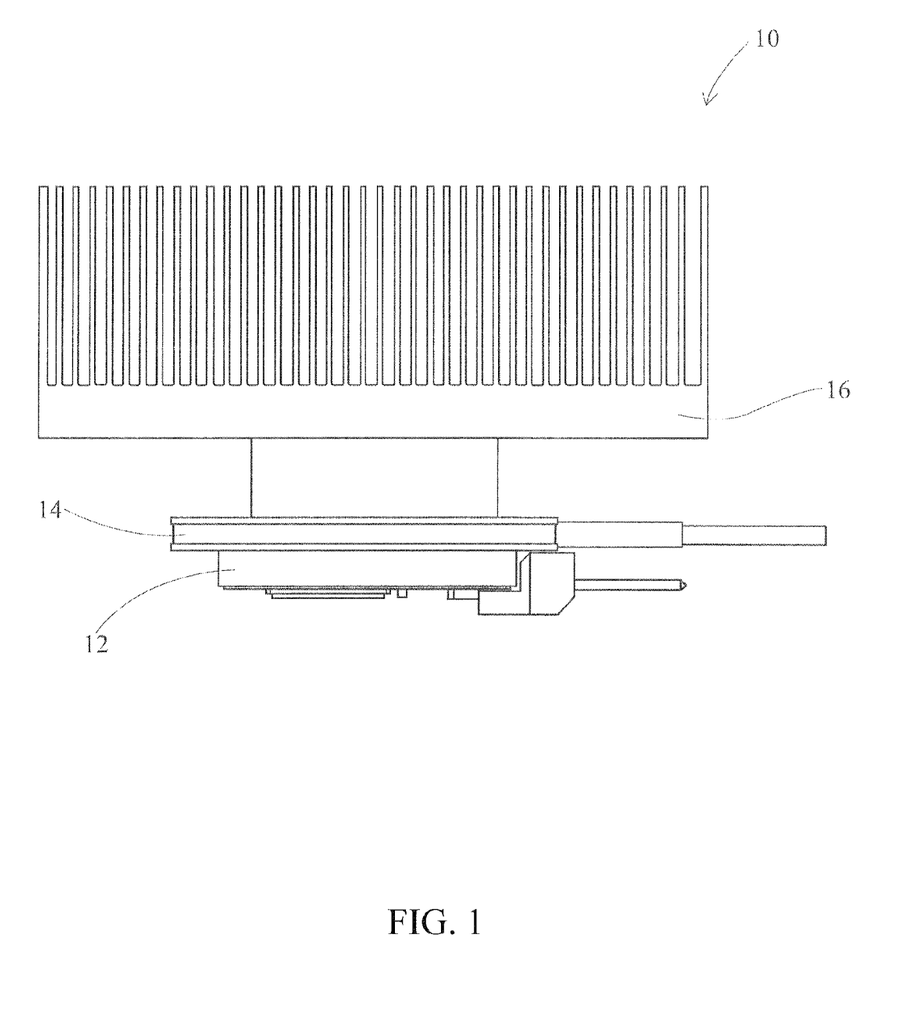
FIG. 1 is a schematic diagram of a cooling system of the prior art.

FIG. 1 is a schematic diagram of a cooling system 10 in a conventional projector. The cooling system 10 uses a thermoelectric cooler (TEC) to dissipate heat generated during the operation of the projector. As shown in FIG. 1, the conventional cooling system 10 comprises a thermoelectric cooler 14 and a heat dissipating module 16. The thermoelectric cooler 14 is disposed at the first side of a heat source 12, while the heat dissipating module 16 is disposed at the second side of the thermoelectric cooler 14 opposite to the heat source 12. The heat source 12 may be a light source consisting of light emitting diodes (LEDs) in the projector or other elements tending to generate intense heat in the projector. The heat dissipating module 16 may be a heat sink fin set, a heat sink fin set installed with heat pipes, a liquid cooling device or a condensing cooling device.

During the operation of the aforesaid conventional projector, the heat source 12 may generate extremely intense heat. In such a case, the user has to initiate the thermoelectric cooler 14 to assist the heat dissipating module 16 in cooling the heat source 12, such that the heat dissipating efficiency of the heat dissipating module 16 may be improved. Recently, in regards to the common thermoelectric cooler 14, the heat conduction principle thereof is to dissipate heat by means of a temperature difference between the cold and hot end of a semiconductor after being powered on. The operation of the thermoelectric cooler 14 requires the consumption of a great amount of power. Moreover, when the thermoelectric cooler 14 is turned off, the thermoelectric cooler 14 presents great thermal resistance instead of becoming a poor heat conductor. As a result, for the purposes of heat dissipation, conventional projectors with a thermoelectric cooler must, during the operation, continuously consume a large amount of electric power to keep the thermoelectric cooler operating while assisting the heat dissipating module 16 in dissipating heat. Accordingly, the consumption of a large amount of electric power is not desired in the current market of saving power and protecting the environment.

SUMMARY OF THE INVENTION

The objective of the present invention is to provide a cooling system with both an excellent heat dissipating capability and an excellent power saving function and a projection apparatus having the cooling system to solve the aforesaid problem in the prior art.

To achieve the aforesaid objective, the claims of the present invention disclose a cooling system with a power saving function for cooling a heat source. The cooling system comprises a heat dissipating device and at least one thermoelectric cooler (TEC). The heat source is disposed at the first side of the heat dissipating device, while the thermoelectric cooler is disposed at the second side of the heat dissipating device opposite to the heat source without coming into direct contact with the heat source. The thermoelectric cooler is initiated to assist the heat dissipating device in dissipating heat generated from the heat source when the temperature of the heat source is greater than the first value, and is shut off when the temperature of the heat source is lower than the second value.

To achieve the aforesaid objective, the claims of the present invention further disclose a projection apparatus. The projection apparatus comprises a heat source, a cooling system and a controller. The cooling system comprises a heat dissipating device and at least one thermoelectric cooler. The heat source is disposed at the first side of the heat dissipating device, while the thermoelectric cooler is disposed at the second side of the heat dissipating device opposite to the heat source without coming into direct contact with the heat source. The thermoelectric cooler is initiated to assist the heat dissipating device in dissipating heat generated from the heat source when the temperature of the heat source is greater than the first value, and is shut off when the temperature of the heat source is lower than the second value. The controller is coupled to the thermoelectric cooler for initiating or shutting off the thermoelectric cooler according to the temperature of the heat source.

With the arrangement of a cooling system and projection apparatus having the same described above, the present invention can initiate the thermoelectric cooler to assist the heat dissipating device in dissipating heat when the temperature of the heat source is higher and shut off the thermoelectric cooler to save electric power when the temperature of the heat source is lower. Therefore, the projection apparatus of the present invention can satisfy both the requirements of saving energy and protecting the environment, while efficiently dissipating high heat.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Because the present invention focuses on the design of the cooling system, the following description will put emphasis only on the features and embodiments which are described in detail in conjunction with the attached drawings by taking only the cooling system and main peripheral elements of a projection apparatus as examples. The other elements not directly related to the cooling system are omitted from depiction. It shall be appreciated that the embodiments of the present invention are not intended to limit the present invention to any specific environment, the applications or particular implementations described in these embodiments. Furthermore, the attached drawings are all schematic views depicted in a simplified way or on a slightly exaggerated scale. The elements shown therein are not to define the number, shape or dimensional scale of these elements in practical implementations but are only of an optional design. Therefore, the actual arrangement of the elements may be more complex, and this shall be stated beforehand hereby.

Figure 2:
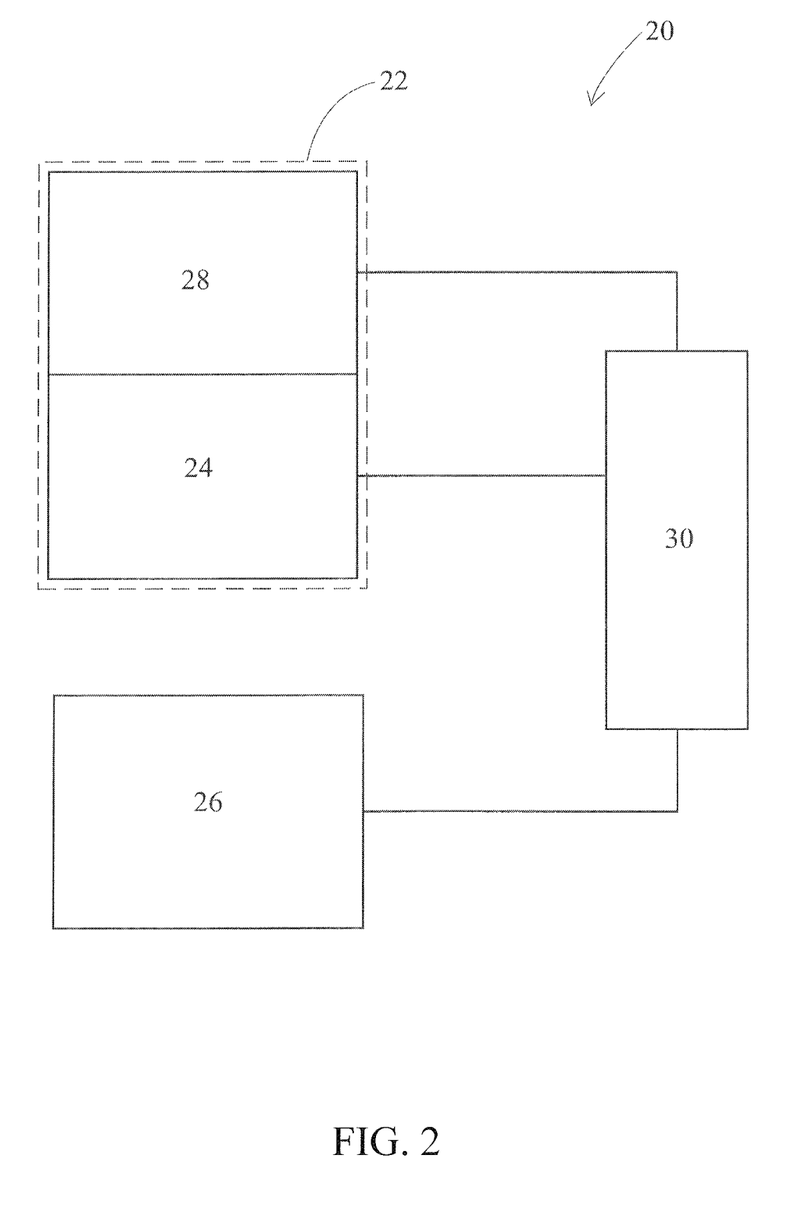
FIG. 2 is a schematic functional block diagram of a projection apparatus according to the preferred embodiment of the present invention.

First, FIG. 2 illustrates a schematic functional block diagram of a projection apparatus 20 according to the preferred embodiment of the present invention. The projection apparatus 20 comprises a cooling system 22, a heat source 26 and a controller 30. The cooling system 22 comprises a heat dissipating device 24 disposed at the first side of the heat source 26. In application, the heat dissipating device 24, which may be a set of heat sink fins, a heat sink fin module installed with a heat pipe, a liquid cooling device or a condensing cooling device, is adapted to dissipate heat generated by the heat source 26. Also, the cooling system 22 further comprises at least one thermoelectric cooler (TEC) 28, which is disposed at the second side of the heat dissipating device 24 opposite to the heat source 26 or is contained in a recessed structure formed at the second side. That is, the thermoelectric cooler 28 and the heat source 26 are installed on the two opposite sides of the heat dissipating device 24 respectively and do not come into contact with each other in space.

To effectively reduce the electric energy consumed by the projection apparatus 20, the projection apparatus 20 comprises a controller 30 that is electrically coupled to the thermoelectric cooler 28. When the detected temperature of the heat source 26 is greater than the first value (e.g. Celsius 80 degree), the controller 30 initiates the heat dissipating device 24 and the thermoelectric cooler 28 simultaneously, such that the thermoelectric cooler 28 can assist the heat dissipating device 24 in accelerating the dissipation of heat generated from the heat source 26. On the other hand, when the detected temperature of the heat source 26 is lower than the second value (e.g. Celsius 75 degree), the controller 30 shuts off the thermoelectric cooler 28 and only keeps the heat dissipating device 24 operating to effectively reduce the electric energy consumed by the projection apparatus 20. The first value is substantially greater than the second value. In other words, when the temperature of the heat source 26 is higher than Celsius 80 degrees, the controller 30 initiates the thermoelectric cooler 28 to assist the heat dissipating device 24 in accelerating the dissipation of heat. When the temperature of the heat source 26 is lower than Celsius 75 degrees, the controller 30 shuts off the thermoelectric cooler 28 to save electric energy. The controller 30 modulates the initiation/shutting off of the thermoelectric cooler 28 within a buffering range, i.e., the temperature range between Celsius 75 degrees and Celsius 80 degrees. As such, when the temperature of the heat source 26 falls at a specific initiation/shutting off point, the buffering range can prevent the controller 30 from repeatedly initiating/shutting off the thermoelectric cooler 28. Accordingly, the inventive feature of the present invention is that the thermoelectric cooler 28 is selectively initiated to save energy.

Figure 3:
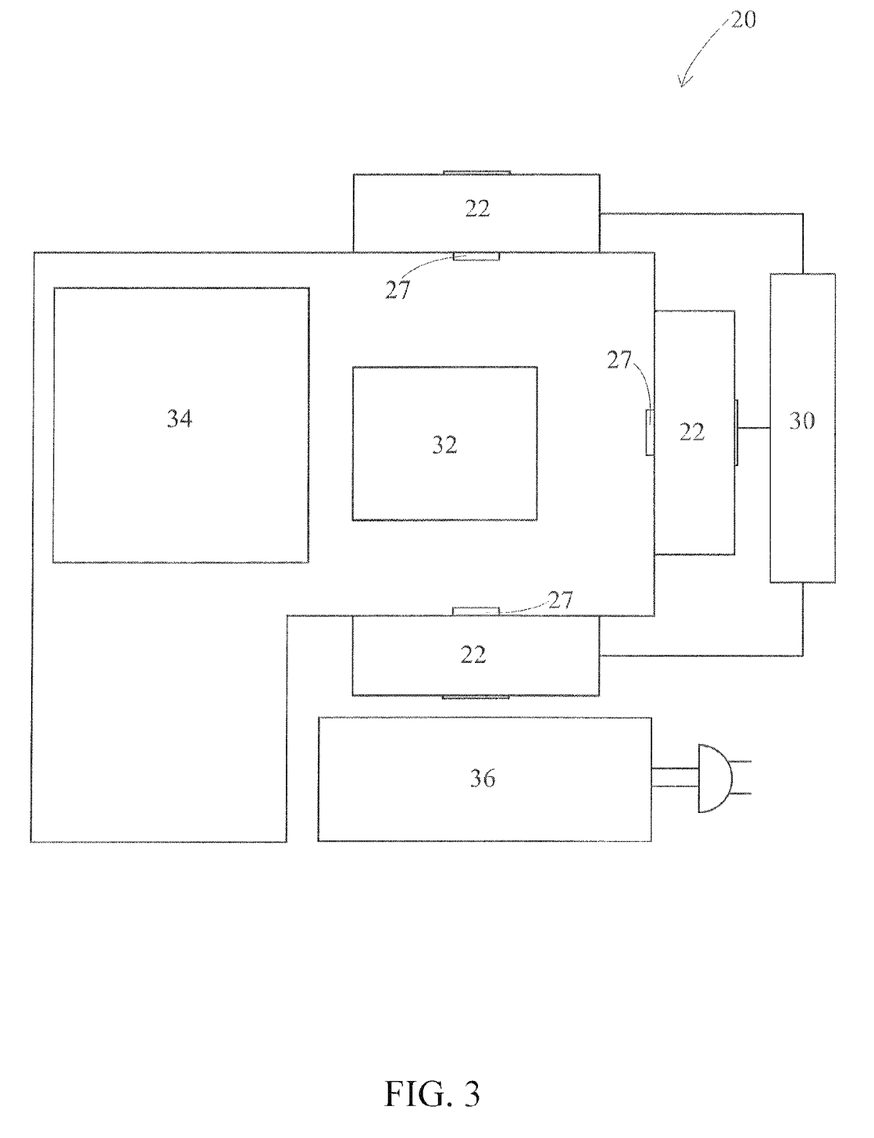
FIG. 3 is a schematic diagram of a projection apparatus according to the preferred embodiment of the present invention.

Next, FIG. 3 illustrates a schematic diagram of a projection apparatus 20 according to the preferred embodiment of the present invention. In this embodiment, the primary heat source of the projection apparatus 20 is a light source module 27. Generally, the projection apparatus 20 may further comprise an optical system 32, a control system 34 and a power system 36. The control system 34 and the power system 36 are respectively adapted to control the functional operation and the electric power modulation of the projection apparatus 20. It shall be particularly emphasized that the light source module 27 may be used as a backlight source of the optical system 32. Furthermore, the control system 34 and the power system 36 may also be considered as heat sources of the projection apparatus 20 in practice. Accordingly, the cooling system 22 may further be installed on any system that generates heat in the projection apparatus 20 as required. Consequently, the number and the installation position(s) of the cooling system(s) 22 or the number and the installation position(s) of the thermoelectric cooler(s) 28 are not limited to what has been described in the aforesaid embodiment but shall be determined depending on the design requirements.

Figure 4:
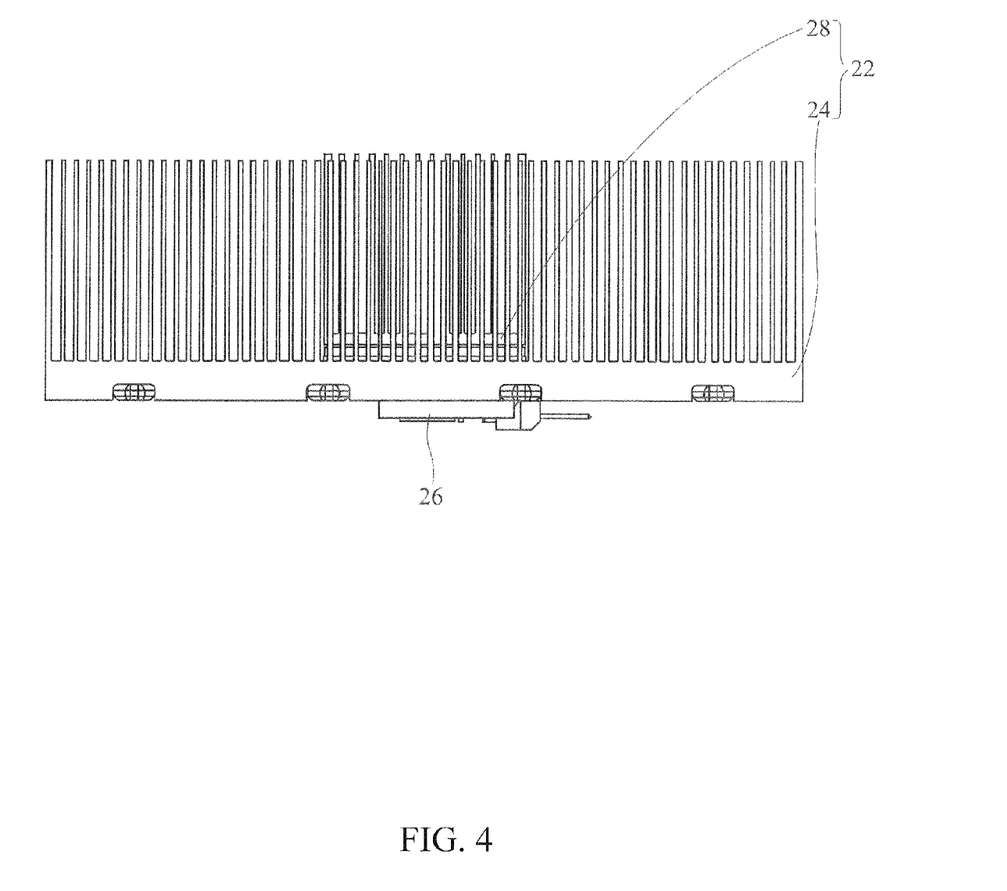
FIG. 4 is a side view diagram of a cooling system according to the first embodiment of the present invention.
Figure 5:
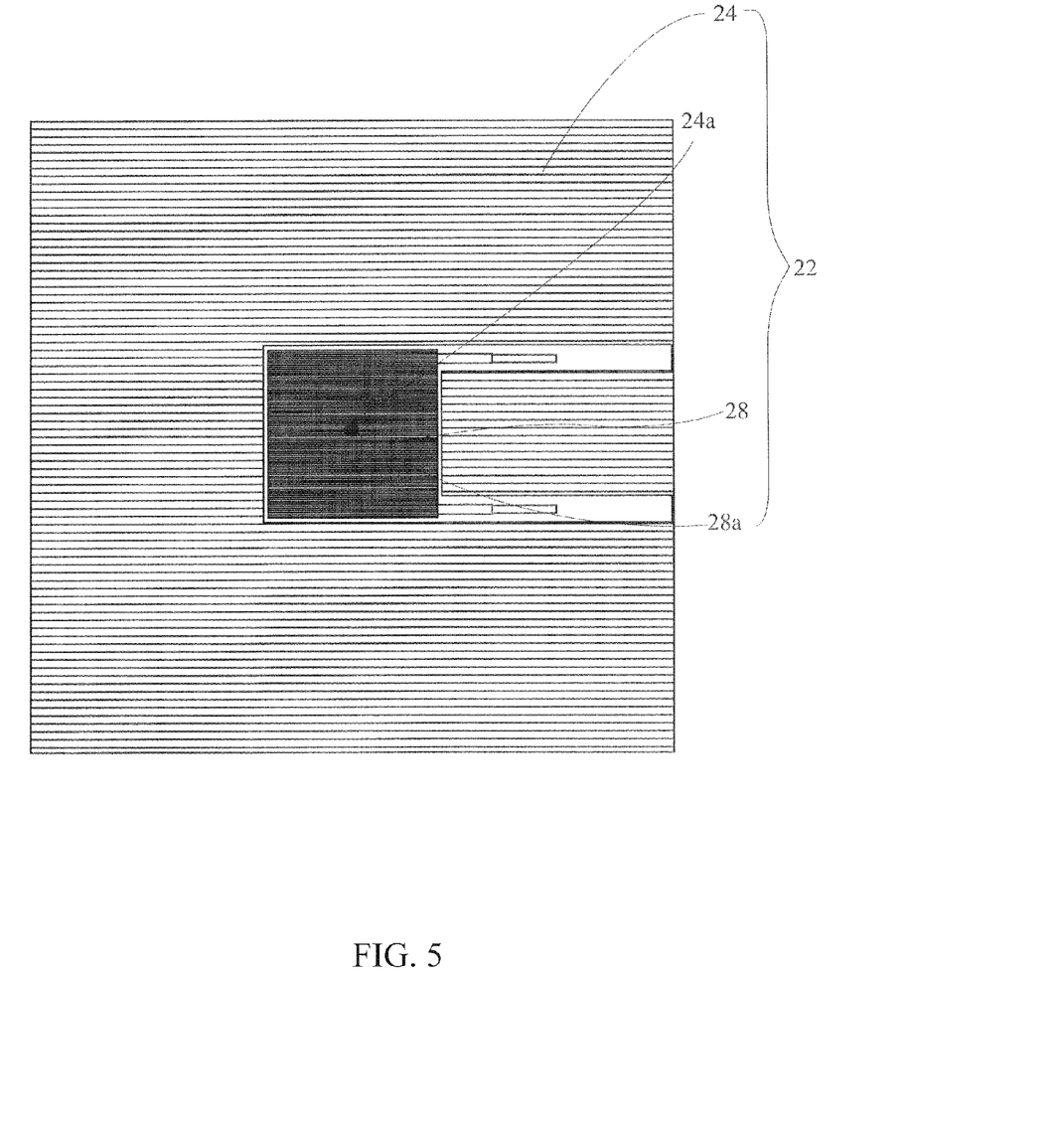
FIG. 5 is a top view diagram of the cooling system according to the first embodiment of the present invention.
Figure 6:
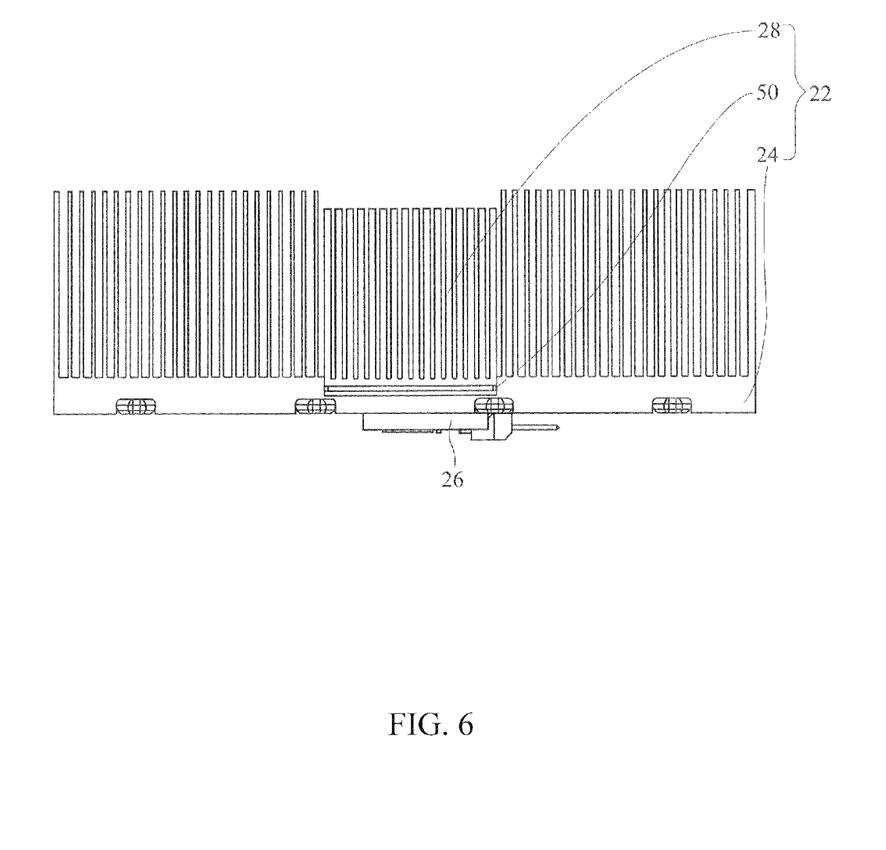
FIG. 6 is a side view diagram of a cooling system according to the second embodiment of the present invention.

Next, in reference to FIGS. 4, 5 and 6, FIG. 4 is a side view diagram of the cooling system 22 according to the first embodiment of the present invention, FIG. 5 is a top view diagram of the cooling system 22 according to the first embodiment of the present invention, and FIG. 6 is a side view diagram of a cooling system according to the second embodiment of the present invention. As shown in FIG. 4, in the first embodiment, the heat dissipating device 24 may be a set of heat sink fins or a heat sink fin module installed with a heat pipe. The heat source 26 and the thermoelectric cooler 28 are installed on two sides of the heat dissipating device 24 respectively without coming into contact with each other. Therefore, even if the cooling system 22 only initiates the heat dissipating device 24 for dissipating heat, the thermoelectric cooler 28 in the OFF state will not become a thermal resistor between the heat source 26 and the heat dissipating device 24; i.e., the cooling system 22 can selectively initiate only the heat dissipating device 24 or both the heat dissipating device 24 and the thermoelectric cooler 28 without adversely affecting the heat dissipating efficiency thereof. Furthermore, as shown in FIG. 5, the lateral surface of the thermoelectric cooler 28 that comes into contact with the second side of the heat dissipating device 24 is substantially no greater than the second side of the heat dissipating device 24. The thermoelectric cooler 28 is located at a position adjacent to the center 24a of the second side of the heat dissipating device 24. The center 28a of the thermoelectric cooler 28 and the center 24a of the heat dissipating device 24 are disposed correspondingly to each other, such that the thermoelectric cooler 28 can effectively increase the temperature difference between the heat dissipating device 24 and the heat source 26 and reinforce the flux of heat conduction flow. In such a case, the dissipation of heat generated from the heat source 26 may be accelerated, and thereby the thermoelectric cooler 28 can achieve the efficacy of optimized heat dissipation. In the first embodiment, the lateral surface area of the thermoelectric cooler 28 is smaller than that of the heat dissipating device 24. Specifically, the lateral surface area of the thermoelectric cooler 28 is substantially equal to eight percent of the lateral surface area of the heat dissipating device 24. The aforesaid area distribution ratio obtained through experimentation with which the cooling system 22 can present the optimal heat dissipating efficiency. Furthermore, as shown in FIG. 6, the second embodiment of the present invention is a modified form of the first embodiment. The differences between the second embodiment and the first embodiment is only in that, as can be seen from the cross-sectional side diagram of the second embodiment, the heat dissipating device 24 has a recessed structure 50. The thermoelectric cooler 28 can be buried and embedded in the recess of the recessed structure 50.

Figure 7:
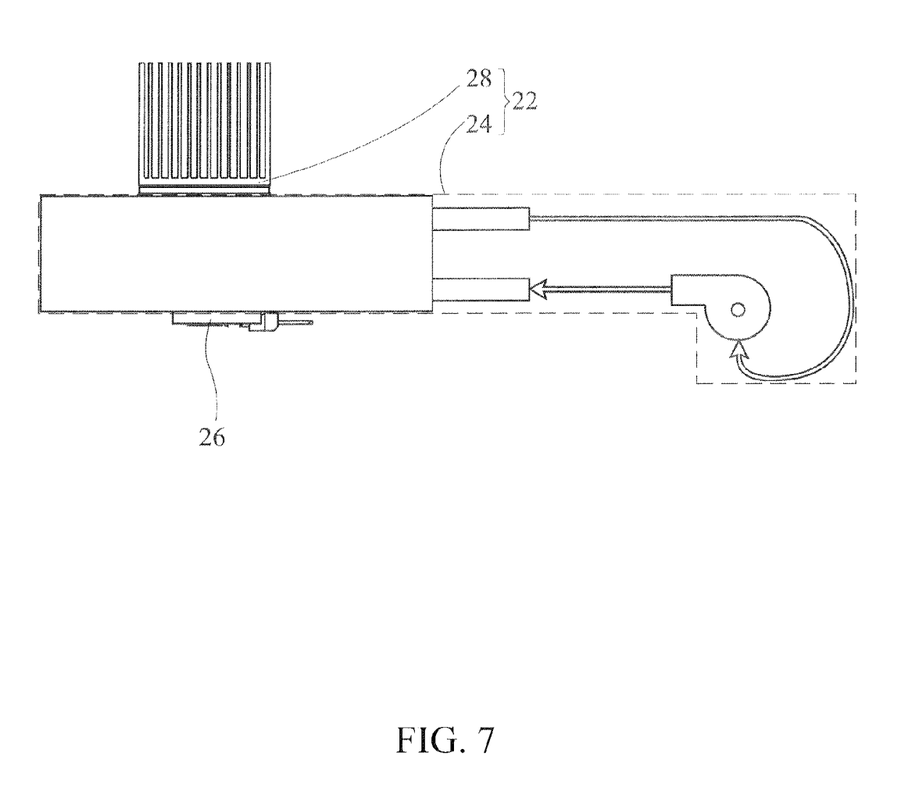
FIG. 7 is a schematic diagram of a cooling system according to the third embodiment of the present invention.
Figure 8:
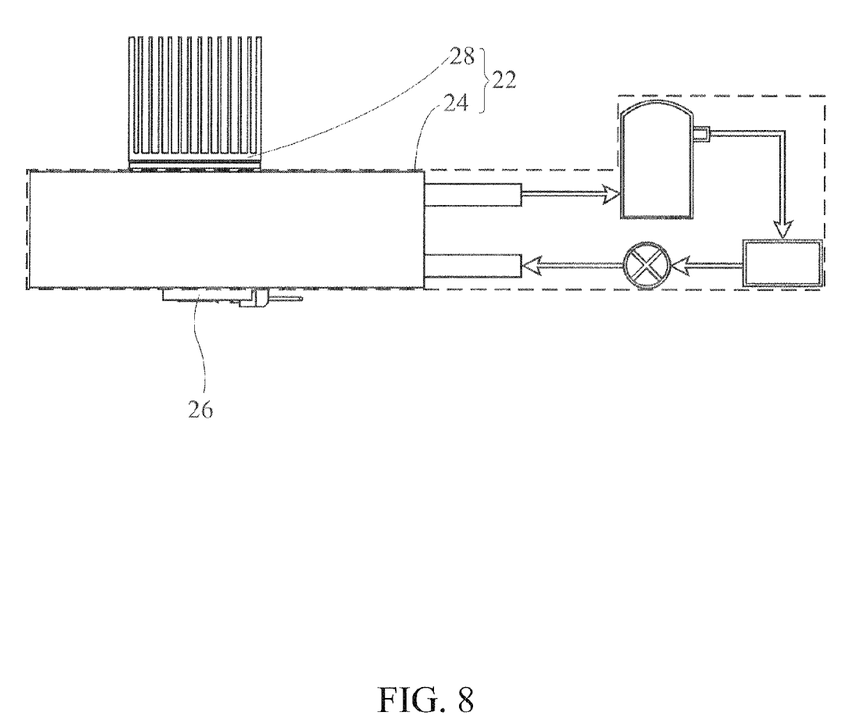
FIG. 8 is a schematic view diagram of a cooling system according to the fourth embodiment of the present invention.

Finally, with reference to both FIGS. 7 and 8, FIG. 7 is a schematic diagram of the cooling system 22 according to the third embodiment of the present invention. FIG. 8 is a schematic diagram of the cooling system 22 according to the fourth embodiment of the present invention. In the third embodiment, a liquid cooling device is used as the heat dissipating device 24 of the cooling system 22; in the fourth embodiment, a condensing cooling device is used as the heat dissipating device 24 of the cooling system 22. The characteristics within both the third embodiment and the fourth embodiment identical to the aforesaid embodiments are in that the thermoelectric cooler 28 is also installed at the side of the heat dissipating device 24 opposite the heat source 26. The thermoelectric cooler 28 and the heat source 26 do not have direct contact with each other. Accordingly even if the thermoelectric cooler 28 is not initiated, the heat generated from the heat source 26 can still be dissipated outwards rapidly through the heat dissipating device 24 without being affected by the thermal resistance of the thermoelectric cooler 28.

Compared with the prior art, the projection apparatus of the present invention has a thermoelectric cooler installed beside the heat dissipating device without coming into contact with the heat source; for example, the heat dissipating device is usually disposed between the heat source and the thermoelectric cooler. The ratio of the lateral surface area of the thermoelectric cooler to that of the heat dissipating device and the installation positions of the thermoelectric cooler and the heat dissipating device are determined on the basis of the strict experimental data, such that the thermal resistance of the thermoelectric cooler before being initiated will not affect the heat dissipation mechanism through which the heat dissipating device dissipates heat generated from the heat source. Furthermore, the controller of the projection apparatus of the present invention can set a condition for triggering the thermoelectric cooler (e.g., a temperature varying range) according to actual environment requirements, such that the thermoelectric cooler can be initiated to assist the heat dissipating device in dissipating heat when the temperature of the heat source is higher and be shut off to save electric energy when the temperature of heat source is lower. Therefore, the projection apparatus of the present invention can satisfy both the requirements of saving energy and protecting the environment, as well as efficiently dissipate high heat.

What is claimed is:

1. A cooling system for cooling a heat source, comprising:
   a heat dissipating device, including heat sink fins wherein the heat source is disposed at a first side of the heat dissipating device; and
   a thermoelectric cooler (TEC) disposed at a second side of the heat dissipating device opposite to the heat source without direct contact with the heat source, wherein the thermoelectric cooler is surrounded by the heat sink fins of the heat dissipating device, the thermoelectric cooler is initiated to assist the heat dissipating device in dissipating heat generated from the heat source when a temperature of the heat source is greater than a first value, and is shut off when the temperature of the heat source is lower than a second value.

2. The cooling system of claim 1, wherein the heat dissipating device comprises a recess structure disposed at the second side of the heat dissipating device for containing the thermoelectric cooler.

3. The cooling system of claim 1, wherein a lateral surface of the thermoelectric cooler in contact with the second side of the heat dissipating device is substantially no greater than the second side of the heat dissipating device.

4. The cooling system of claim 3, wherein the lateral surface of the thermoelectric cooler has an area substantially equal to eight percent of the second side of the heat dissipating device.

5. The cooling system of claim 1, wherein the first value is substantially greater than the second value.

6. The cooling system of claim 1, wherein the thermoelectric cooler is located at a position adjacent to a center of the second side of the heat dissipating device.

7. A projection apparatus, comprising:
   a heat source;
   a cooling system of claim 1; and
   a controller coupled to the thermoelectric cooler for initiating or shutting off the thermoelectric cooler according to a temperature of the heat source.

8. The projection apparatus of claim 7, wherein the heat dissipating device comprises a recess structure disposed at the second side of the heat dissipating device for containing the thermoelectric cooler.

9. The projection apparatus of claim 7, wherein a lateral surface of the thermoelectric cooler in contact with the second side of the heat dissipating device is substantially no greater than the second side of the heat dissipating device.

10. The projection apparatus of claim 9, wherein the lateral surface of the thermoelectric cooler has an area substantially equal to eight percent of the second side of the heat dissipating device.

11. The projection apparatus of claim 7, wherein the first value is substantially greater than the second value.

12. The projection apparatus of claim 7, wherein the thermoelectric cooler is located at a position adjacent to a center of the second side of the heat dissipating device.

13. The projection apparatus of claim 7, wherein the heat source is a light source module.

* * * * *